Figure 1:
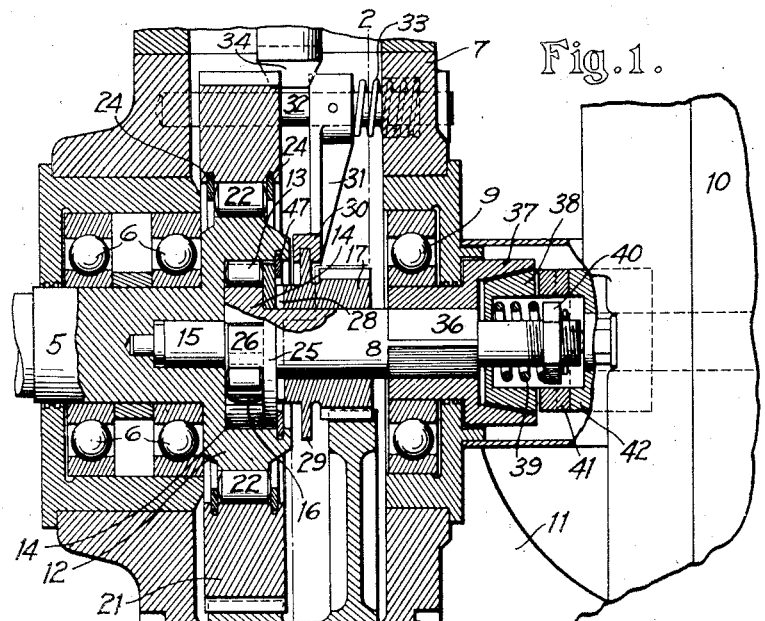

E. A. HALBLEIB.
POWER TRANSMISSION MECHANISM.
APPLICATION FILED MAY 28, 1913.

1,105,904.

Patented Aug. 4, 1914.

Witnesses:
Clarence W. Carroll
D. Gurnee

Inventor:
Edward A. Halbleib
by his attorneys
Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

POWER-TRANSMISSION MECHANISM.

1,105,904.         Specification of Letters Patent.         Patented Aug. 4, 1914.

Application filed May 28, 1913.   Serial No. 770,544.

*To all whom it may concern:*

Be it known that I, EDWARD A. HALBLEIB, a citizen of the United States, and resident of Rochester, in the county of Monroe and State of New York, have invented certain new and useful Improvements in Power-Transmission Mechanism, of which the following is a specification.

This invention relates to power-transmission mechanism wherein two rotary elements or shafts are connected in such a manner that either one of them may actuate the other in the same direction of rotation, the connections being so arranged as to produce different speed-ratios between the elements, according as one or the other is acting as the driving element.

In an application relating to mechanism of the type in question, filed by me in the United States Patent Office January 24, 1912, Serial No. 673,271, I have disclosed a mechanism in which automatic one-direction clutches are employed to throw speed-reducing gearing into or out of operation, according as the secondary rotary element or the primary rotary element constitutes the driver. In such an arrangement the one-direction clutches act, incidentally, to oppose or lock the gearing against reverse rotation on the part of the primary rotary element. Where the mechanism is employed to connect an internal-combustion engine with an electric generator, for the purpose of generating electricity during the normal operation of the engine, and to permit the generator, on the other hand, to provide power for starting the engine, this locking-action, while having no effect upon the normal operation of the apparatus, is objectionable in the case of a "back-kick" or any tendency on the part of the engine to rotate reversely, such as frequently occurs in the use of apparatus of the kind in question.

The object of the present invention is to produce a construction in which the locking action of the mechanism just described may be avoided, and in which means are provided whereby the pinion above referred to may be thrown out of rotative connection with the second rotary element when the first rotary element is acting as the driver, thus permitting the gearing to come to rest at this time, or to rotate only so fast as may result from the slight friction in the clutches and in the bearing-surfaces between the pinion and the second rotary element.

To the foregoing end the invention consists in the construction and arrangement of parts hereinafter described, as they are defined in the appended claims.

Figure 2:
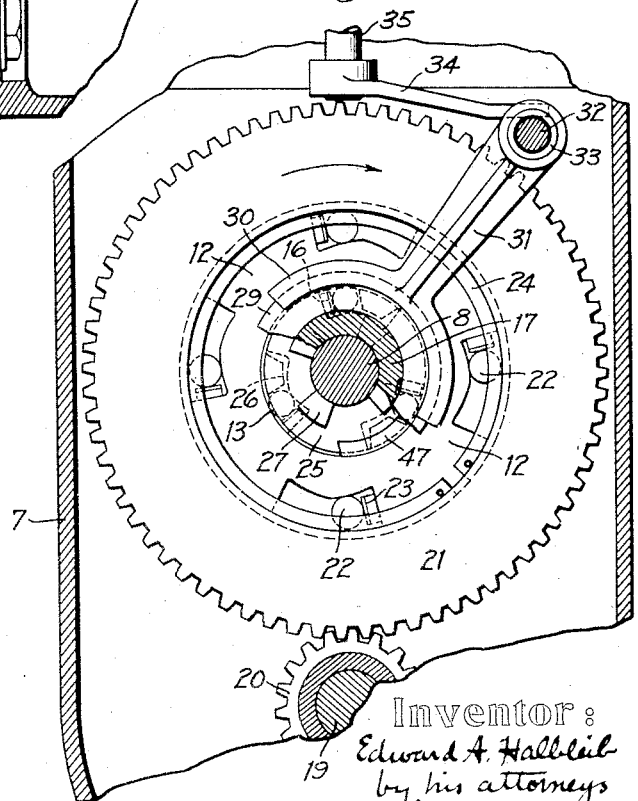
Figure 3:
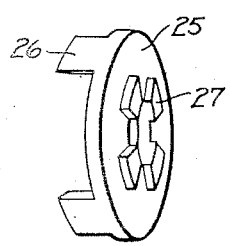

In the accompanying drawings: Figure 1 is a vertical section of power-transmission mechanism embodying the present invention, on a plane coincident with the axes of rotation of the several parts of the mechanism; Fig. 2 is a vertical section on the line 2—2 in Fig. 1, looking from right to left in the latter figure, and Fig. 3 is a perspective view of the third rotary element peculiar to the present construction.

The present invention is illustrated as embodied in a mechanism which, in general arrangement and operation, is similar to the mechanism of my said application, Serial No. 673,271. The first rotary element, which is adapted to be connected with the engine, is in the form of a short shaft 5, which is mounted in ball-bearings 6 in a casing 7. The second rotary element is also a short shaft 8, which is supported, near its right-hand end, by a ball-bearing 9 in the casing 7. This shaft is adapted to be connected with the armature-shaft of an electric generator, of which only a portion of the casing 10 is illustrated, the generator-casing being rigidly connected with the casing 7 by means of a member 11 integral with the latter. The left-hand end of the shaft 8 comprises a reduced portion 15 which is journaled in a recess in the shaft 5, the two shafts being thus held securely in coaxial alinement, while free to rotate independently when necessary. The right-hand end of the shaft 5 is expanded to form a shell 12, of which the smooth inner surface constitutes the outer member of a one-direction clutch, the inner member of which is provided by an integral enlargement 14 on the shaft 8. The part 14 is formed with recesses, shown in dotted lines in Fig. 2, and rollers 13, located in these recesses, connect the clutch-members so that they operate in the well-known manner of a roller-wedge friction-clutch, the recesses being so inclined at the bottom that when the shaft 5 and the shell 12 are rotated in the direction indicated by arrows in Fig. 2, which is the normal direction of operation of the mechanism, the rollers are pinched between the two clutch-members, and the first rotary element or shaft 5 drives the second rotary element or shaft 8 directly, that is, without change of speed. To insure the action of the rollers 13, a spring-pressed follower 16 is introduced between each roller and the end of the recess in which it operates.

The gearing through which the second rotary element may actuate the first rotary element at a reduced speed-ratio comprises a pinion 17, mounted upon the shaft 8 and meshing with a gear 18, which is journaled loosely upon a countershaft 19 fixed in the casing 7. The gear 18 is integral with a second pinion 20 which meshes, in turn, with a gear 21. The gear 21 is annular in form, and its smooth inner surface constitutes a clutch-member adapted to coöperate with a clutch-member formed on the outer surface of the shell 12. This latter clutch-member is provided with a series of recesses, as shown particularly in Fig. 2, containing rollers 22 which cause the clutch-members to operate in the manner of a roller-wedge one-direction clutch, the recesses being so inclined at the bottom as to cause the rollers to pinch between the clutch-surfaces when the gear 21 is rotated in the direction indicated by the arrows in Fig. 2, and thus to drive the shell 12 and the shaft 5 by power derived from the shaft 8 through the gearing. The rollers 22 and the gear 21 are retained in operative position by snap-rings 24 seated in grooves in the gear, and the rollers 22 are held up to their work by spring-pressed followers 23, as shown in Fig. 22.

The means for unlocking the mechanism against reverse rotation of the first rotary element or shaft 5 comprises a part which is shown particularly in Fig. 2, and which is hereinafter described as the "third rotary element." This part has an annular body 25 which is journaled loosely upon the shaft 8. Integral with this body are three fingers 26, which project into the recesses in the clutch-member 14, in advance of the friction-rollers 13. Upon the right-hand surface of the body 25 are integral clutch-teeth 27, adapted to coöperate with correspondingly-formed teeth 28 formed on the left-hand extremity of the pinion 17. The third rotary element is held against longitudinal movement on the shaft 8 by means of a snap-ring 47 seated in a groove in the shell 12, as shown in Fig. 1, and the fingers 26 are of such width that they may have a certain movement or lost motion, within the recesses in the clutch-member 14, when the rollers 13 are in operative engagement between the clutch-surfaces.

When the clutch-teeth 27 and 28 are in engagement the pinion 17 and the third rotary element act as one part, and control the operation of the clutch-rollers 13. Thus, when the generator is being employed as a motor, to start the engine by rotating the shaft 5 through the speed-reducing gearing, the rotation of the shaft 8 causes the rollers 13 to be pressed against the fingers 26, thus rotating the third rotary element and the pinion 17, and driving the shaft 5 through the gearing and the outer one-direction clutch. Under these circumstances, upon the occurrence of a back-kick in the engine, and a reverse rotation in the shaft 5, the direction of operation of the gearing is reversed, and the pinion 17 is rotated in a reverse direction faster than the shaft 5 and the shell 6. Since this reverse rotation is transmitted to the shaft 8 through the fingers 26, which press the rollers 13 to the deeper ends of their recesses, the rollers are held out of operative engagement with the inner clutch-surfaces on the shell 12, so that the inner clutch cannot prevent such reverse rotation on the part of the shaft 8, and the mechanism is thus unlocked against reverse rotation.

When the shaft 5 constitutes the driver, during the normal operation of the engine, the pinion 17 may be shifted in a right-hand direction upon the shaft 8, so as to disengage the clutch-teeth 27 and 28. The third rotary element is then supported loosely upon the shaft 8, and the fingers 26 do not interfere with the operation of the clutch-rollers 13, as they may be moved freely out of the way of these rollers within the recesses in the clutch-member 14. At the same time there is no positive connection between the pinion 17 and the shaft 8, so that the pinion and the other parts of the gearing are not rotated positively during this normal operation of the mechanism.

To shift the pinion 17 for the purpose just described it is illustrated as provided with an annular flange 29, which is embraced by the slotted end 30 of an arm 31. This arm is fixed on a rod 32, which is mounted in the casing parallel with the axes of the shafts 5 and 8, and is free to slide in the direction of its length. A compression-spring 33, surrounding the rod 32 and interposed between the casing-wall and the arm 31, tends constantly to move the parts in the direction to engage the clutch-members upon the pinion and the third rotary element. To move the parts in the opposite direction, an arm 34 engages the end of the arm 31, and this arm 34 is fixed on the lower end of a vertical shaft 35. The shaft 35 may be rotated manually in any convenient manner, so as to swing the arm 34 in a direction to cause it to press the arm 31 to the right, and thus move the pinion 17, against the opposition of the spring 33, to disengage the pinion from connection with the third rotary element.

Although the arrangements above described operate to unlock the mechanism against reverse rotation in the shaft 5, it will be apparent that when such reverse rotation occurs while the shaft 8 and the generator armature are rotating rapidly in the normal direction, a sudden reversal in the direction of rotation of these parts, such as the gearing tends to produce, may subject the mechanism to a severe strain. To avoid such strain I preferably employ a yielding connection or friction-coupling at some point in the mechanism, and I have illustrated such a yielding connection as interposed between the shaft 8 and the armature-shaft of the generator. To this end the shaft 8 has a squared part 36 upon which is mounted a coupling-member 37 having a conical inner surface. A second coupling-member 38 with a corresponding friction-surface is seated in the member 37, and is forced into frictional engagement therewith by a compression-spring 39, which is coiled around the shaft 8 and is seated, at one end, against a nut 40 screwed upon the shaft. The coupling-member 38 is connected, in any suitable manner, with the armature-shaft of the generator, and for this purpose I have illustrated coupling members 41 and 42, which may have the form of the well-known Oldham coupling, to compensate for slight inaccuracies in the alinement of the shafts. As couplings of this type are well known, I have not particularly illustrated or described the form of the members 41 and 42, but it will be understood that the member 42 may be attached in any convenient manner to the armature-shaft of the generator, as indicated in dotted lines in Fig. 1.

I claim:—

1. Power-transmission mechanism having, in combination, a first rotary element; a second rotary element; a one-direction clutch for connecting said elements, whereby the first element may actuate the second element; a third rotary element coaxial with the second element and normally rotative therewith, but adapted for a limited rotation relatively thereto; gearing through which the second element may actuate the first element, said gearing including a driving-pinion co-axial with the first element but rotatable relatively thereto; a second clutch, for connecting said pinion with the third rotary element, and connections, between the third element and the first-mentioned clutch, whereby the clutch may be thrown out of operation, in consequence of relative rotation of the second and third elements, when the first element and the gearing are reversely rotated, said connections being also adapted to afford a driving-connection whereby the second element may actuate the third element and drive the first element through the second clutch and the gearing; the second clutch being operable to disconnect said pinion from the second element when the first element is actuating the second element.

2. Power-transmission mechanism having, in combination, a first rotary element; a second rotary element coaxial therewith; a roller-wedge clutch connecting said elements, whereby the first element may actuate the second element in the normal direction of operation, while the second element may overrun the first element in said direction; a third rotary element, journaled upon the second rotary element and provided with fingers adapted to engage the rollers of said clutch and to throw them into inoperative position in consequence of relative rotation between the third and second elements, the third element being provided also with a clutch-member; gearing through which the second element may actuate the first element, at a reduced speed, in the normal direction of rotation, said gearing including a driving-pinion journaled upon the second element and provided with a clutch-member adapted to coöperate with the clutch-member on the third element; and means for shifting the pinion upon the second element, to disengage it from operative connection, through said clutch-members, with the third element when the first element drives the second element through the roller-wedge clutch.

3. Power-transmission mechanism having, in combination, a first rotary element; a second rotary element coaxial therewith; a roller-wedge clutch, connecting said elements, whereby the first element may actuate the second element in the normal direction of operation, while the second element may overrun the first element in said direction; a third rotary element journaled upon the second rotary element and provided with fingers adapted to engage the rollers of said clutch and to throw them into inoperative position in consequence of relative rotation between the third and second elements, the third element being provided also with a clutch-member; gearing through which the second element may actuate the first element, at a reduced speed, in the normal direction of rotation, said gearing including a driving-pinion journaled upon the second element and provided with a clutch-member adapted to coöperate with the clutch-member on the third element; means for shifting the pinion upon the second element, to disengage it from operative connection with the third element when the first element drives the second element through the roller-wedge clutch; and a second roller-wedge clutch connecting said gearing with the first element and adapted to permit the first element to overrun the gearing in the normal direction of rotation.

EDWARD A. HALBLEIB.

Witnesses:
FARNUM F. DORSEY,
D. GURNEE.